US007796890B1

(12) United States Patent
Johnson (10) Patent No.: US 7,796,890 B1
(45) Date of Patent: Sep. 14, 2010

(54) HYBRID PON/SURFACE WAVE TERRESTRIAL ACCESS

(75) Inventor: Harold W. Johnson, Roach, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 873 days.

(21) Appl. No.: 11/049,120

(22) Filed: Feb. 1, 2005

(51) Int. Cl.
*H04B 10/00* (2006.01)
(52) U.S. Cl. .................. 398/115; 398/116; 398/142
(58) Field of Classification Search .......... 398/70, 398/115–117, 142; 375/220
See application file for complete search history.

(56) References Cited

U.S. PATENT DOCUMENTS 6,785,558 B1 8/2004 Stratford et al.
7,095,957 B1 * 8/2006 Britz et al. ................. 398/70
2002/0187809 A1 12/2002 Mani et al.
2003/0053484 A1 3/2003 Sorenson et al.
2005/0111533 A1 * 5/2005 Berkman et al. ............ 375/220

* cited by examiner

*Primary Examiner*—Agustin Bello (57) ABSTRACT

A system and method for distributing high bandwidth signals is disclosed. The system and method use electrical transmission lines to distribute high bandwidth RF signals. The RF signals are sent along the electrical transmission lines using surface wave transmission. RF/Optical converters located along the electrical transmission lines are used to convert the RF signals into optical signals. Passive optical networks (PON) are used to transmit the optical signals between the RF/Optical converter and a customer site or location.

16 Claims, 8 Drawing Sheets

HYBRID PON/SURFACE WAVE TERRESTRIAL ACCESS

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to communication network architectures and services.

2. Description of the Prior Art

High bandwidth communication usage is increasing rapidly. The current last-mile link to a customer site for high bandwidth communications is typically a wireless link, coax cable, or DSL service. Each of these last-mile access technologies may have drawbacks that prevent the fulfillment of all the customers needs. For example, DSL access may be geographically limited.

Therefore there is a need for a different architecture for distributing high bandwidth communication signals to a customer site.

SUMMARY OF THE INVENTION

A system and method for distributing high bandwidth signals is disclosed. The system and method use electrical transmission lines to distribute high bandwidth RF signals. The RF signals are sent along the electrical transmission lines using surface wave transmission. RF/Optical converters located along the electrical transmission lines are used to convert the RF signals into optical signals. Passive optical networks (PON) are used to transmit the optical signals between the RF/Optical converter and a customer site or location.

DETAILED DESCRIPTION OF THE PREFERRED EMBODIMENT

FIGS. 1-8 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

One way that companies are distributing high bandwidth signals is by using the current electrical distribution system as a distribution network for RF signals. The RF signals are transmitted along the electrical transmission lines using surface wave technology. Surface waves are electromagnetic waves that travel or propagate along the surface of a cylindrical wire. One example of surface wave use is G-line transmission of broadband TV signals. An extension of G-line transmission is E-line transmission developed by Glen Elmore at Hewlett-Packard Co. E-line transmission is a low cost low loss distribution system for wide band RF signals. Information on E-line transmissions can be found at http://www.corridor.biz. By linking an RF distribution system that uses electrical transmission wires with a low cost passive optical network (PON) that connects to a customer site, high bandwidth signals can be made available almost anywhere that electrical power is available. A PON is typically an optical network that does not require any active electronics such as repeaters.

Figure 1:
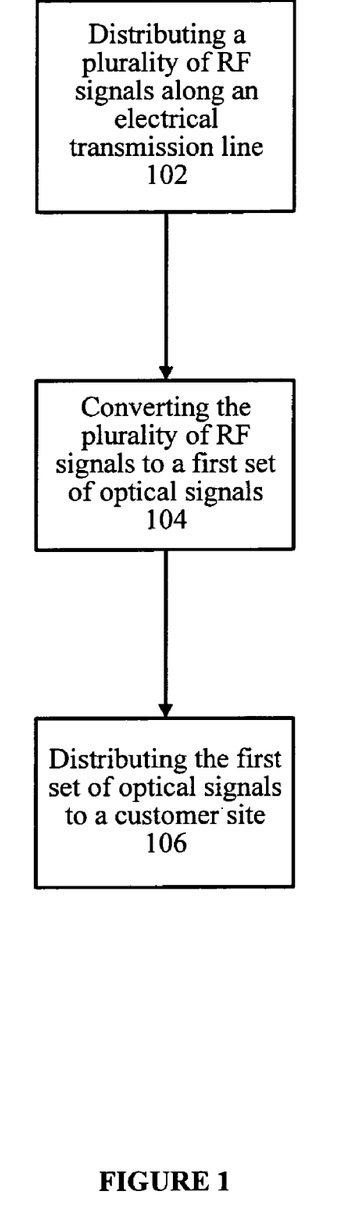
FIG. 1 is a flow chart for a method of distributing communication signals to a customer site in one example embodiment of the current invention.

FIG. 1 is a flow chart for a method of distributing communication signals to a customer site in one example embodiment of the current invention. At step 102 a plurality of RF signals are distributed along an electrical transmission line to a first location using surface wave transmission. At step 104, at the first location, the plurality of RF signals are converted to a first set of optical signals. At Step 106 the first set of optical signals are distributed to a first customer site using a passive optical network (PON).

Figure 2:
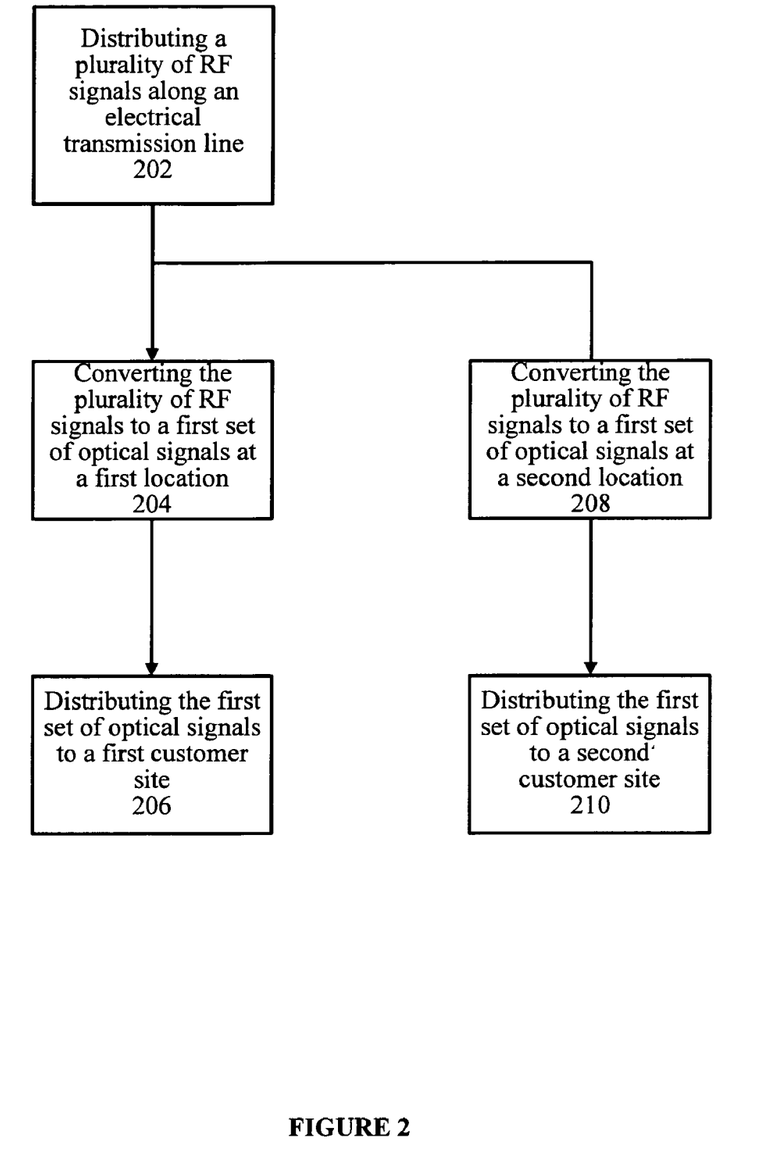
FIG. 2 is a flow chart for a method of distributing communication signals to a plurality of customer sites in another example embodiment of the current invention.

FIG. 2 is a flow chart for a method of distributing communication signals to a plurality of customer sites in another example embodiment of the current invention. At step 202 a plurality of RF signals are distributed along an electrical transmission line to a plurality of locations using surface wave transmission. At step 204, at a first one of the plurality of locations, the plurality of RF signals are converted to a first set of optical signals. At Step 206 the first set of optical signals are distributed to a first customer site using a passive optical network (PON). At step 208, at a second one of the plurality of locations, the plurality of RF signals are converted to a second set of optical signals. At Step 210 the second set of optical signals are distributed to a second customer site using a passive optical network (PON). In one example embodiment of the current invention there may be multiple customer sites connected to one RF/Optical converter using the PON. In another example embodiment of the current invention there may be multiple RF/Optical converter at one location feeding multiple customer sites. Each RF/Optical converter may have its' own passive optical network that links the RF/Optical converter to a customer site. Or there may be only one PON connecting multiple RF/Optical converters to multiple customer sites at the one location.

In one example embodiment of the current invention, all of the RF signals traveling along the electrical transmission line are converted to optical signals at each of the RF/Optical converters. In another example embodiment, only a subset of the RF signals traveling along the electrical transmission line are converted into optical signals at each of the RF/optical converters. There may be a different subset of the RF signals converted into optical signals at each of the different RF/Optical converters or there may be a number of locations where the same subset of RF signals are converted into optical signals. One way to separate a subset of signals from the plurality of signals is with a band pass filter. Each location that converts a subset of the plurality of RF signals may have one or more band pass filters used to separate the signals for that location. Other separation methods may be used.

Figure 3:
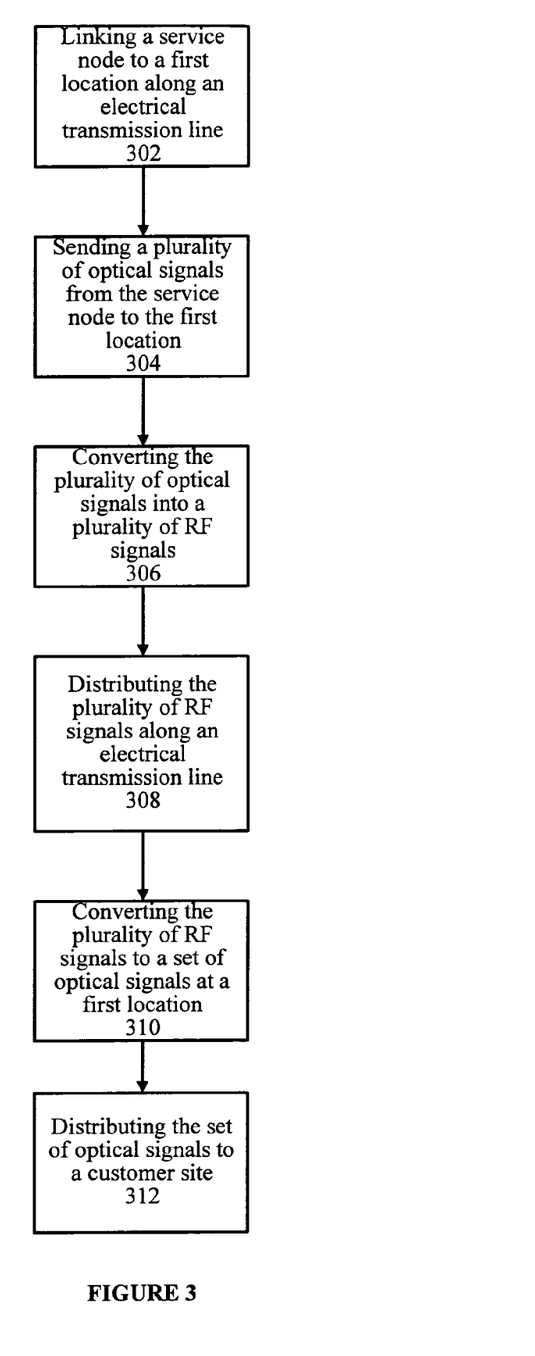
FIG. 3 is a flow chart for a method of distributing communication signals from a service node in another example embodiment of the current invention.

FIG. 3 is a flow chart for a method of distributing communication signals from a service node in another example embodiment of the current invention. At Step 302 a service node is linked to a first location along an electrical transmission line using a passive optical network (PON). At step 304 a plurality of optical signals are sent from the service node to the first location using a passive optical network (PON). At step 306, at the first location, the plurality of optical signals are converted into a plurality of RF signals. At step 308 the plurality of RF signals are distributed along the electrical transmission line to a second location using surface wave transmission. At step 310, at the second location, the plurality of RF signals are converted to a first set of optical signals. At Step 312 the first set of optical signals are distributed to a first customer site using a passive optical network (PON).

Figure 4:
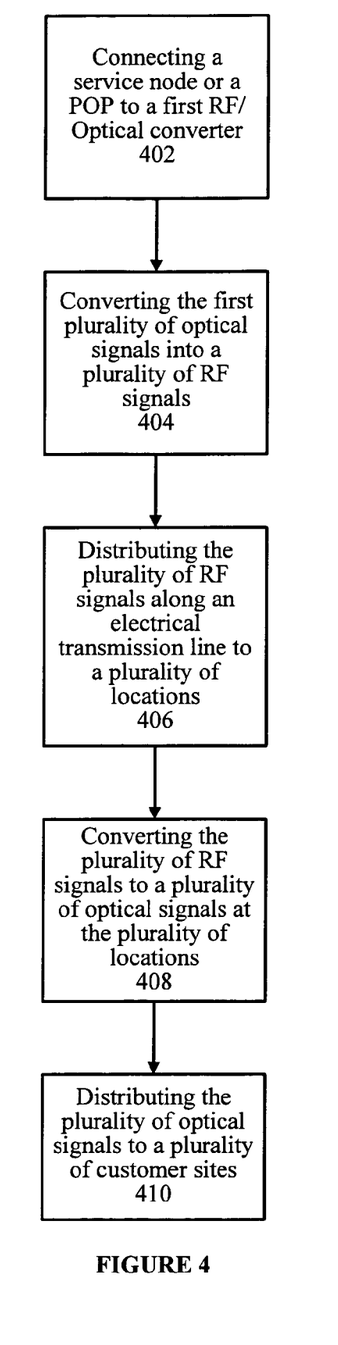
FIG. 4 is a flow chart for a method of forming a communications network in an example embodiment of the invention.

FIG. 4 is a flow chart for a method of forming a communications network in an example embodiment of the invention. At step 402 a communications network is formed for distributing a first plurality of optical signals to a plurality of customer sites by connecting a service node or a POP to a first RF/Optical converter using a first passive optical network (PON). At step 404 the first plurality of optical signals are converted into a plurality of RF signals at the first RF/Optical converter. At step 406 the plurality of RF signals are distributed along an electrical transmission line to a plurality of positions along the electrical transmission line using surface wave transmission. At step 408 the plurality of RF signals are converted at the plurality of positions into a second plurality of optical signals using a plurality of RF/Optical converters. At step 410 the second plurality of optical signals are transferred to the plurality of customer sites using a plurality of PONs. In one example embodiment of the invention the communication network forms a linear add/drop topology. In another example embodiment the communications network forms a ring topology. Other topologies are also possible.

Figure 5:
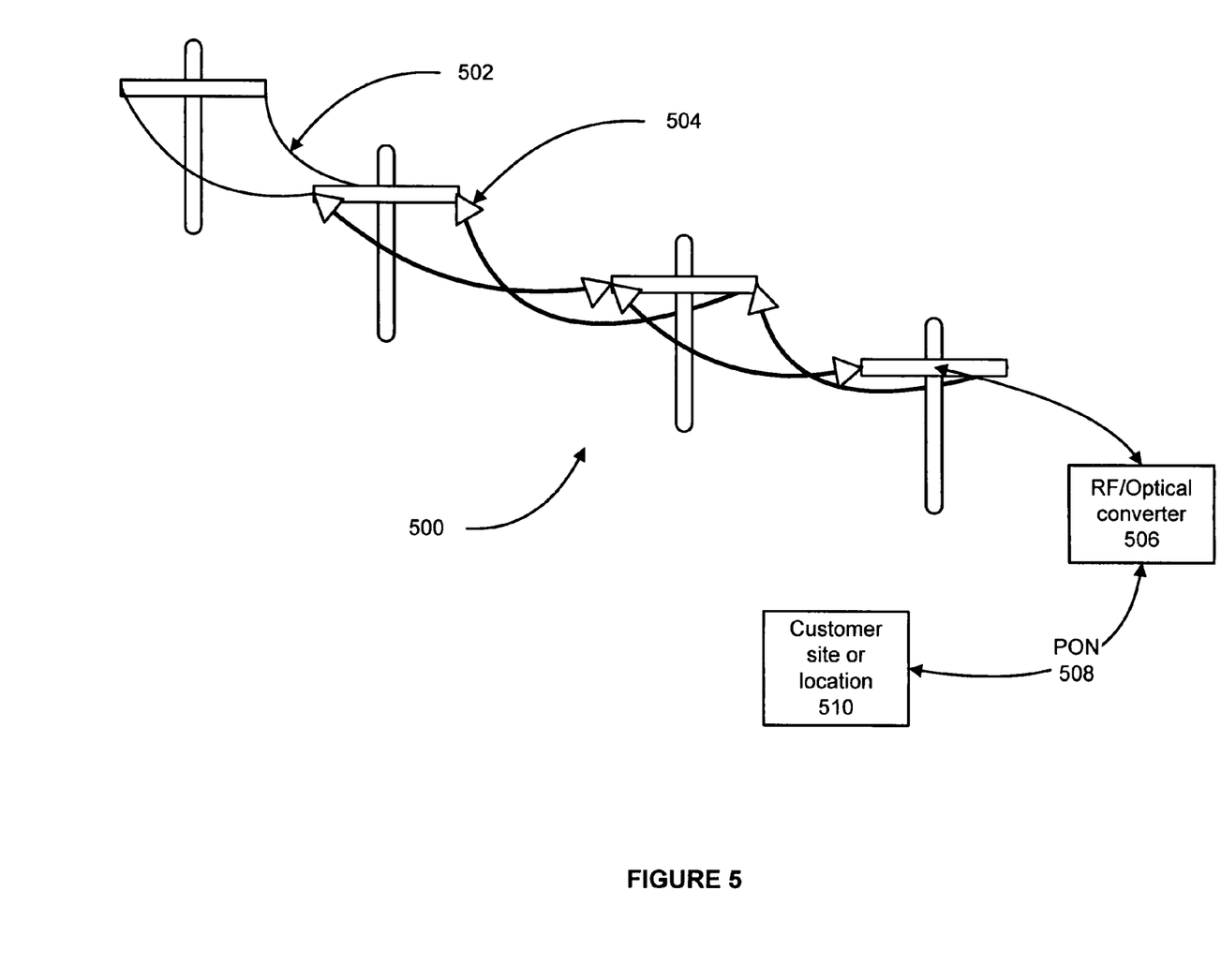
FIG. 5 is a block diagram of a communications system in an example embodiment of the invention.

FIG. 5 is a block diagram of a communications system 500 in an example embodiment of the invention. Communication system 500 comprises an electrical transmission line 502. Electric transmission line 502 is typically part of an electrical distribution system. A surface wave transmission system 504 is attached to the electrical transmission line and configured to transmit a plurality of RF signals along the electrical transmission lines using surface wave transmission. The surface wave transmission system 504 may comprise a plurality of surface wave transmitters place along the electrical transmission line. In one example embodiment of the invention, the RF signals may be between 800-900 MHz, 1850-1990 MHz, 2400-2485 MHz, 5800-5900 MHz, or the like. An RF/Optical converter 506 is placed at a position along the electrical transmission line that corresponds to part of the surface wave transmission system 504. RF/Optical converter 506 is connected to the surface wave transmission system and is configured to convert the plurality of RF signals propagated by the surface wave transmission system into optical signals. RF/Optical converter 506 may convert all or only a subset of the plurality of RF signals into optical signals. A band pass filter may be used to separate the subset of signals to be converted from the plurality of RF signals. RF/Optical converter 506 is connected to customer site 510 with a passive optical network 508. The optical signals are propagated from RF/Optical converter 506 to the customer site 510 using the PON. Using this system, high bandwidth signals can be distributed to a customer site.

Figure 6:
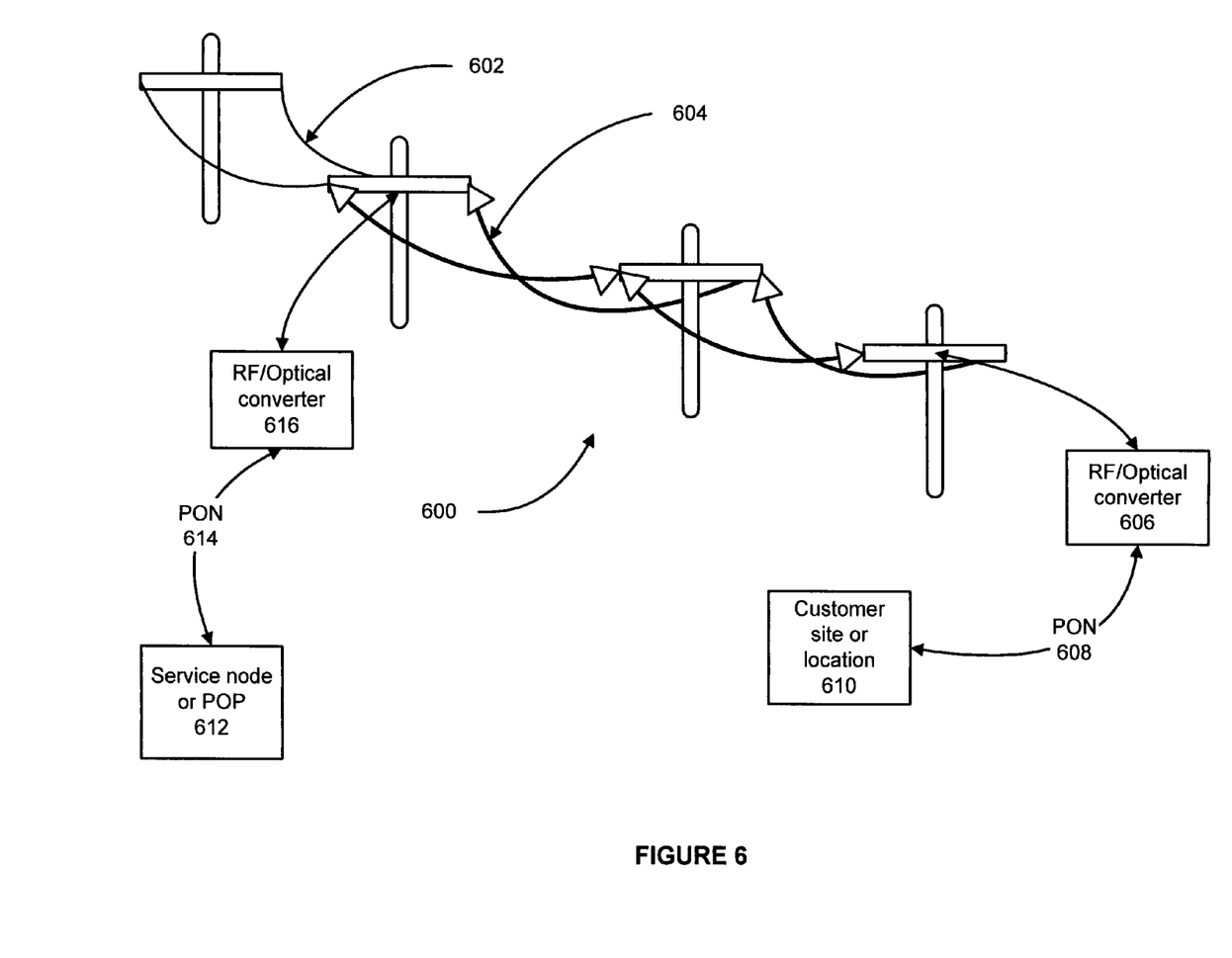
FIG. 6 is a block diagram of a communication system in another example embodiment of the invention.

FIG. 6 is a block diagram of a communication system in another example embodiment of the invention. Communication system 600 has service node or point of presence (POP) 612, RF/Optical converters 606 and 616, electrical transmission line 602, surface wave transmission system 604, passive optical networks 608 and 616, and customer site 610.

Electric transmission line 602 is typically part of an electrical distribution system (not shown). The surface wave transmission system 604 is attached to the electrical transmission line and configured to transmit a plurality of RF signals along the electrical transmission lines using surface wave transmission. The surface wave transmission system 604 may comprise a plurality of surface wave transmitters place along the electrical transmission line 602. In one example embodiment of the invention, the RF signals may be between 800-900 MHz, 1850-1990 MHz, 2400-2485 MHz, 5800-5900 MHz, or the like. A plurality of communication signals enter communication system 600 at service node or POP 612. Service node or POP 612 is connected to PON 614. PON 614 connects service node or POP 612 to RF/Optical converter 616. Service node or POP 612 sends the plurality of communication signals along PON 614 to RF/Optical converter 616 as a plurality of optical signals. RF/Optical converter 616 is placed at a first position along the electrical transmission line 602 that corresponds to part of the surface wave transmission system 604. RF/optical converter 616 is configured to convert the plurality of optical signals propagated by PON 614 into a plurality of RF signals. RF/Optical converter 616 is connected to surface wave transmission system 604 and sends the plurality of RF to surface wave transmission system 604. Surface wave transmission system 604 is configured to transmit the plurality of RF signals along the electrical transmission lines using surface wave transmission. RF/Optical converter 606 is placed at a second position along the electrical transmission line that corresponds to part of the surface wave transmission system 604. RF/Optical converter 606 is connected to the surface wave transmission system and is configured to convert the plurality of RF signals propagated by the surface wave transmission system into optical signals. RF/Optical converter 606 may convert all or only a subset of the plurality of RF signals into optical signals. A band pass filter may be used to separate the subset of signals to be converted from the plurality of RF signals. RF/Optical converter 606 is connected to customer site 610 with a passive optical network 608. The optical signals are propagated from RF/Optical converter 606 to the customer site 610 using the PON 608.

Figure 7:
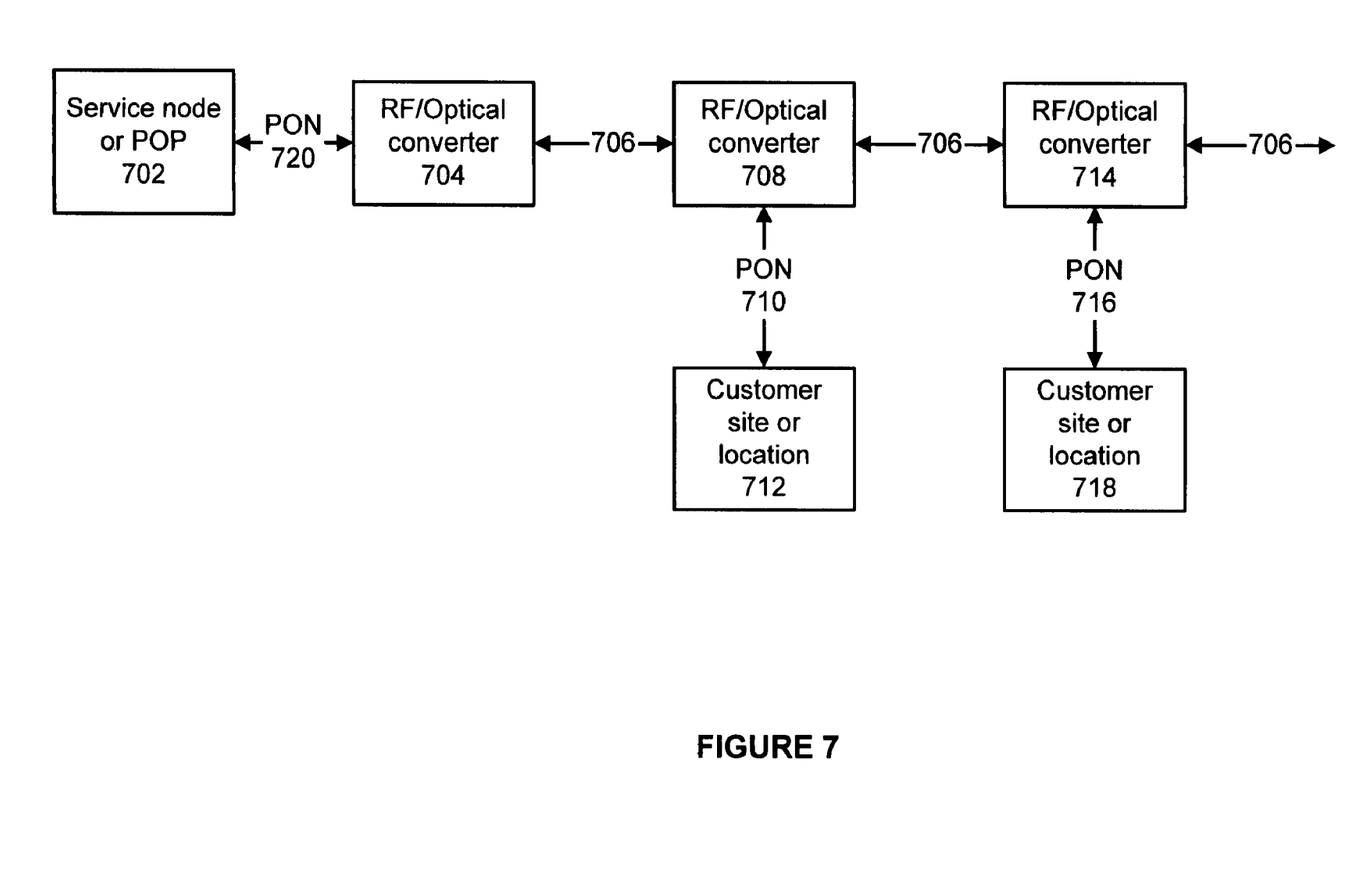
FIG. 7 is a block diagram of a communication system using linear topology in an example embodiment of the current invention.
Figure 8:
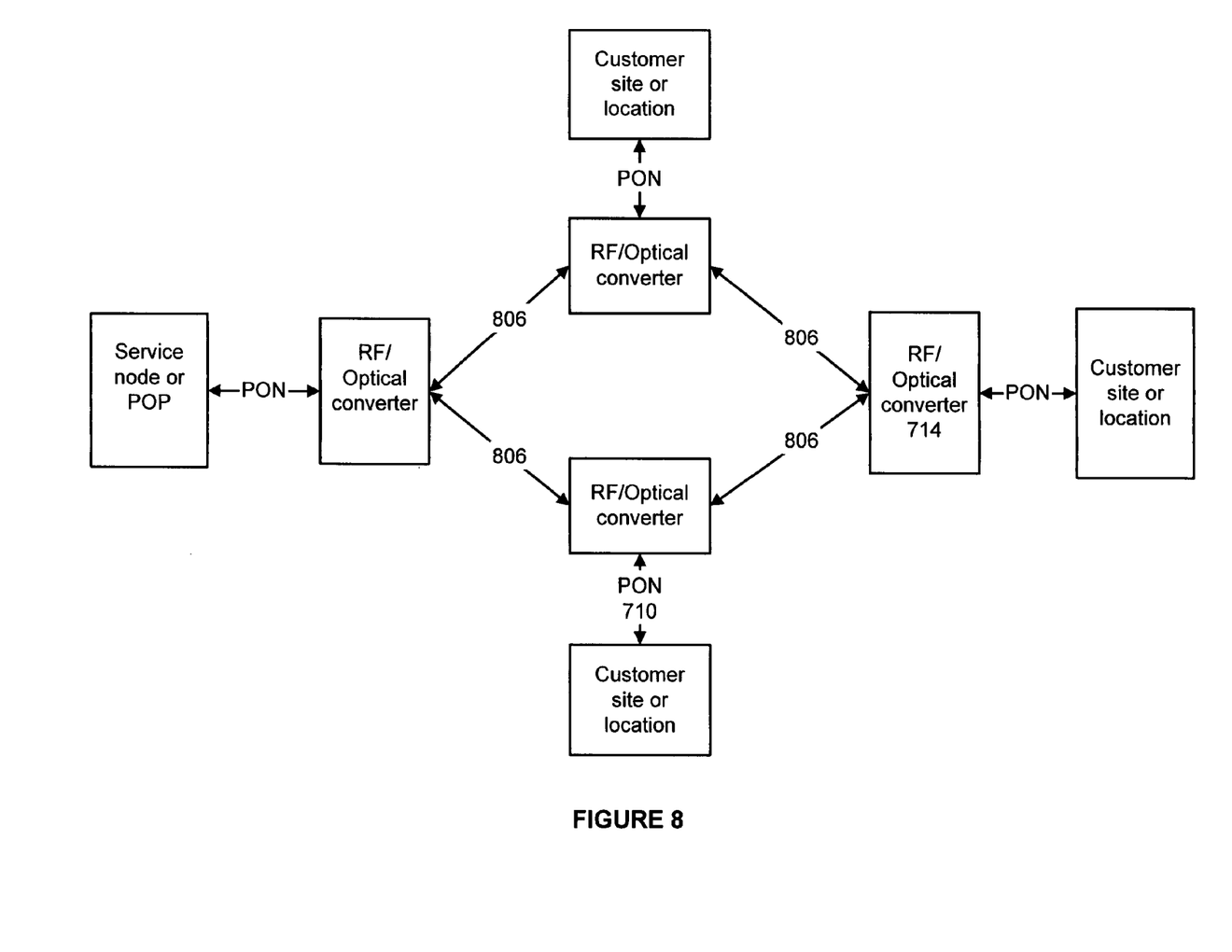
FIG. 8 is a block diagram of a communication system using ring topology in an example embodiment of the current invention.

FIG. 7 is a block diagram of a communication system 700 using linear topology in an example embodiment of the current invention. The communication system 700 has a service node or a POP 702 connected with RF/Optical converter 704 using PON 720. RF/Optical converter is connected to surface wave transmission system 706. Surface wave transmission system 706 links RF/Optical converter 704 to RF/Optical converter 708. Surface wave transmission system 706 also links RF/Optical converter 708 to RF/Optical converter 714. Customer location 712 is connected to RF/Optical converter 708 by PON 710. Customer location 718 is connected to RF/Optical converter 714 by PON 716. There could be additional customer sites attached to the surface wave transmission system with additional RF/Optical converters. FIG. 8 is a block diagram of a communication system using ring topology in an example embodiment of the current invention.

I claim:

1. A method, comprising:
distributing a plurality of optical signals over a first passive optical network (PON) from a service node to a first radio frequency (RF)/Optical converter coupled to an electrical transmission line;
converting the plurality of optical signals into a plurality of RF signals at the first RF/Optical converter;
distributing the plurality of RF signals along the electrical transmission line to a second RF/Optical converter using surface wave transmission;
receiving the plurality of RF signals at the second RF/Converter coupled to the electrical transmission line;
converting, at the second RF/Optical converter, a first subset of the plurality of RF signals to a first set of optical signals; and
distributing the first set of optical signals to a first customer site using a second PON.

2. The method of claim 1 where a first band pass filter is used to select the first subset of the plurality of RF signals distributed along the electrical transmission line.

3. The method of claim 1 further comprising:
distributing the plurality of RF signals along the electrical transmission line to a third RF/Optical converter using surface wave transmission;
receiving the plurality of RF signals at the third RF/Optical converter coupled to the electrical transmission line;
converting, at the third RF/Optical converter, a second subset of the plurality of RF signals to a second set of optical signals;
distributing the second set of optical signals to a second customer site using a second PON.

4. The method of claim 3 where a second band pass filter is used to select the second subset of the plurality of RF signals distributed along the electrical transmission line.

5. The method of claim 3 where:
the electrical transmission line connects the first RF/Optical converter to the second RF/Optical converter;
the electrical transmission line connects the second RF/Optical converter to the third RF/Optical converter; and
the electrical transmission line connects the third RF/Optical converter to the first RF/Optical converter forming a ring topology.

6. The method of claim 3 where:
the electrical transmission line connects the first RF/Optical converter to the second RF/Optical converter;
the electrical transmission line connects the second RF/Optical converter to the third RF/Optical converter forming a linear add/drop topology.

7. The method of claim 1 further comprising:
distributing a plurality of optical signals from a point of presence (POP) to the first RF/Optical converter using the first PON.

8. The method of claim 1 where the plurality of RF signals are in the frequency range between 800 MHz to 10 GHz.

9. The communication system of claim 1 further comprising:
a point of presence (POP) configured to transmit the plurality of optical signals over the first PON to the first RF/Optical converter.

10. A communication system comprising:
an electrical transmission line;
a service node configured to transmit a plurality of optical signals over a first passive optical network (PON) to a first radio frequency (RF)/Optical converter coupled to the electrical transmission line;
a surface wave transmission system configured to transmit a plurality of radio frequency (RF) signals along the electrical transmission line using surface wave transmission;
the first RF/Optical converter coupled to the electrical transmission line, where the first RF/Optical converter is configured to convert the plurality of optical signals into the plurality of RF signals;
a second RF/Optical converter coupled to the electrical transmission line, where the second RF/Optical converter is configured to convert a first subset of the plurality of RF signals into a first set of optical signals;
a PON connected to the second RF/Optical converter;
the second PON connected to a first customer site and configured to transmit the first set of optical signals between the second RF/Optical converter and the first customer site.

11. The communication system of claim 10 where a first band pass filter is used to select the first subset of the plurality of RF signals distributed along the electrical transmission line.

12. The communication system of claim 10 further comprising:
a third RF/Optical converter coupled to the electrical transmission line, where the third RF/Optical converter is configured to convert a second subset of the plurality of RF signals into a second set of optical signals;
a third PON connected to the third RF/Optical converter;
the third PON connected to a second customer site and configured to transmit the second set of optical signals between the third RF/Optical converter and the second customer site.

13. The communication system of claim 12 where a second band pass filter is used to select the second subset of the plurality of RF signals distributed along the electrical transmission line.

14. The communication system of claim 12 where:
the electrical transmission line connects the first RF/Optical converter to the second RF/Optical converter;
the electrical transmission line connects the second RF/Optical converter to the third RF/Optical converter; and
the electrical transmission line connects the third RF/Optical converter to the first RF/Optical converter forming a ring topology.

15. The communication system of claim 12 where:
the electrical transmission line connects the first RF/Optical converter to the second RF/Optical converter;
the electrical transmission line connects the second RF/Optical converter to the third RF/Optical converter forming a linear add/drop topology.

16. The communication system of claim 10 where the plurality of RF signals are in the frequency range between 800 MHz to 10 GHz.

\* \* \* \* \*